June 21, 1960    W. R. STROM    2,941,347
MOWING IMPLEMENT
Filed March 10, 1958    2 Sheets-Sheet 1
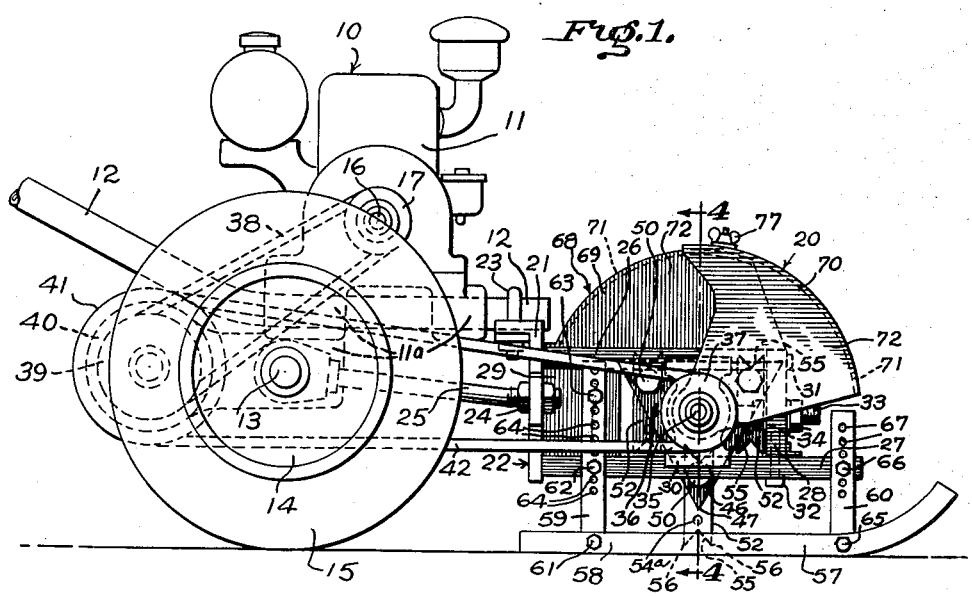
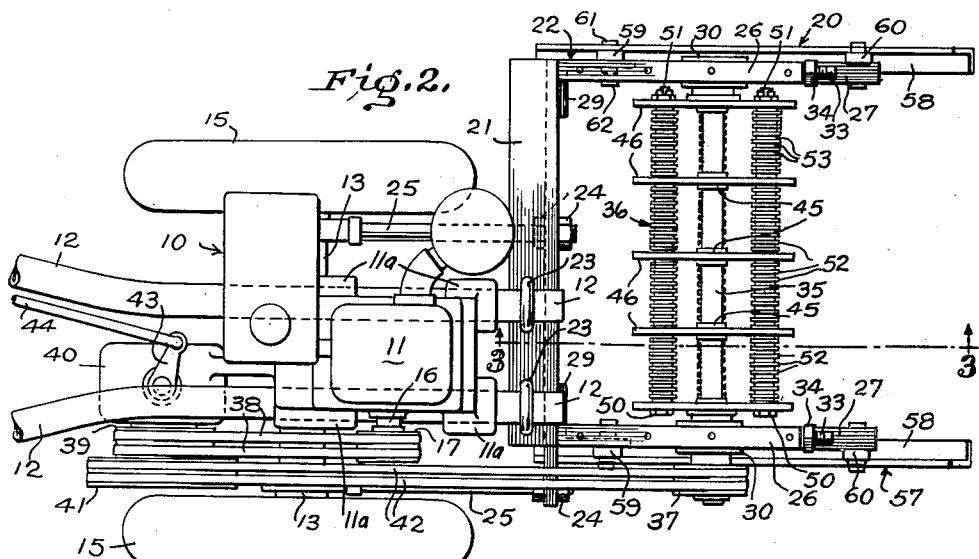
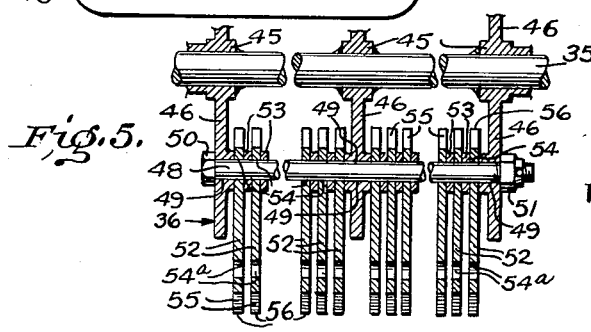
INVENTOR.
William R. Strom
BY Reginald W. Hoagland
ATTORNEY June 21, 1960 W. R. STROM 2,941,347
MOWING IMPLEMENT
Filed March 10, 1958 2 Sheets-Sheet 2
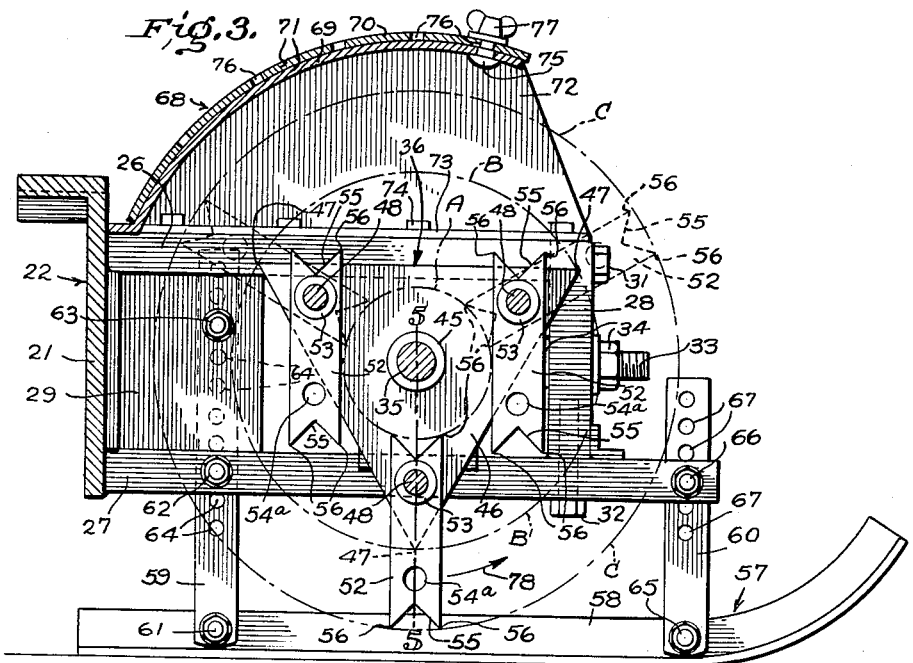
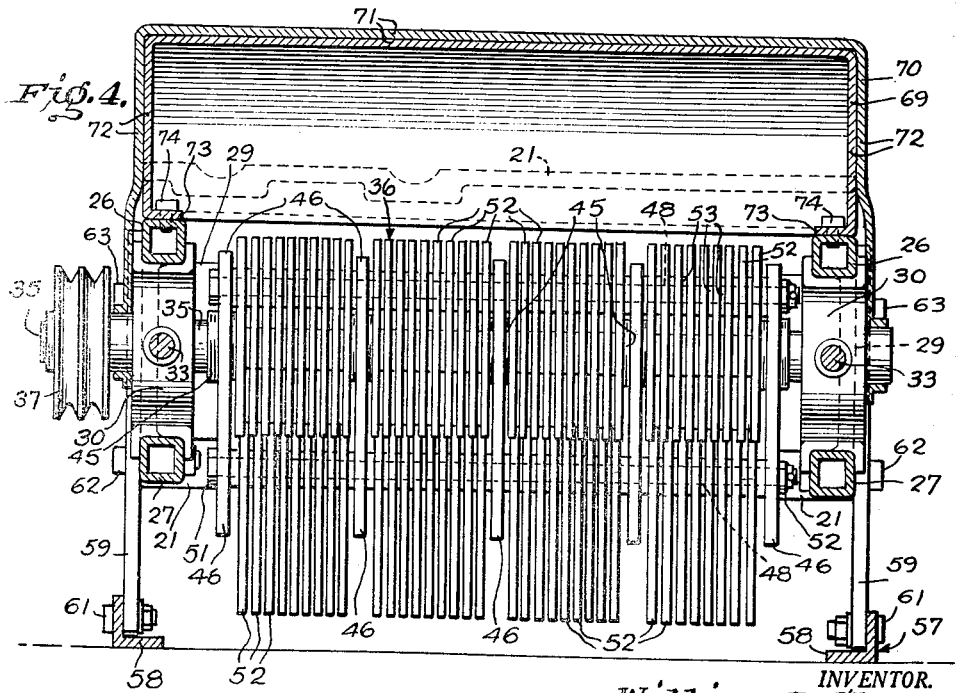
INVENTOR.
William R. Strom
BY Reginald W. Hoagland
ATTORNEY

United States Patent Office 2,941,347
Patented June 21, 1960

2,941,347
MOWING IMPLEMENT

William R. Strom, 6040 Lapeer Road, Flint, Mich.

Filed Mar. 10, 1958, Ser. No. 720,354

1 Claim. (Cl. 56—26)

The present invention relates to mowing implements that are moved over a ground surface for cutting the grass of lawns and for mowing down tall standing vegetation and shredding said tall vegetation into small particles.

An object of the invention is to provide an implement of the above indicated character having a power driven head on which is pivotally carried a plurality of blades that are swung outwardly in prescribed circular paths of movement by centrifugal force upon rotation of said head and are individually swung on their pivotal connections and out of their paths of movement upon contact thereof with stumps, rocks or other immovable objects, thus alleviating breakage of said blades.

Another object of the invention is to provide an implement of the character set forth, wherein the blades are arranged in rows and the pivotal axis of all blades of each row is aligned and all pivotal axes are in spaced parallel relation to a central revolving shaft rotatably supporting the head.

A further object of the invention is to provide an implement head, as above set forth, having rods upon which the rows of blades are pivotally supported, and which in turn are supported at spaced intervals throughout their lengths by flanges of collars fixed to the central revolving shaft of the head.

A still further object of the invention is to provide in an implement of the character set forth, blades of rectangular shape which are rotatably supported adjacent one of their ends, which are interchangeable end for end, and which have both ends V notched to form sharp cutting edges at intersections of their opposite straight side edges with the edges produced by said notching.

Still another object of the invention is to provide an implement of the character set forth wherein the rod supporting disk-like flanges on the collars are triangle in shape and the apexes of said triangular disk-like flanges form sharp cutting edges that revolve in a path movement of lesser diameter than the cutting edges on the free ends of the blades.

Another object of the invention is to provide in an implement of the class described, a novel adjustable hood over the cutter head for confining vegetation thrown by rotation of said head in close proximity to said head so as to be further cut by the blades.

Another object of the invention is to provide in an implement of the character set forth, a novel adjustment for a ground engagement structure so as to vary the height above the ground the vegetation is to be cut.

Another object of the invention is to provide in an implement of the character set forth, a novel driving mechanism for the cutter head, whereby said cutter head may be reversed in its direction of rotation so as to free matter jammed in or around said head.

It is also an object of the invention to provide an implement of the above-indicated character which is simple and substantial in construction, economical to manufacture, and thoroughly efficient and practical in use.

These, together with various auxiliary features and objects of the invention which will later become apparent as the following description proceeds, are attained by the present invention, a preferred embodiment of which has been illustrated by way of example only in the accompanying drawings wherein:

Figure 1 is a side elevation of the improved implement showing the same attached to and driven from a garden tractor;

Figure 2 is a top plan of same with the hood removed;

Figure 3 is an enlarged vertical section taken on line 3—3 of Figure 2 with the hood in place;

Figure 4 is also an enlarged vertical section and is taken on line 4—4 of Figure 1; and Figure 5 is a vertical fragmentary section taken on line 5—5 of Figure 3.

Referring now more specifically to the accompanying drawings wherein like numerals designate similar parts throughout the various views, there is shown, for the purpose of illustration, a garden tractor generally indicated by the numeral 10. While other types of self-propelled apparatuses may just as well be used in conjunction with the present invention, this tractor, which is frameless, has built onto the housing of a gasoline engine 11 thereof a number of bosses 11a through which extend a pair of handle bars 12 and a transverse axle 13 driven from the engine, there being mounted on each end of said axle a ground wheel 14, preferably equipped with a pneumatic tire 15. From one side of the engine 11 there extends a rotatable stub shaft 16 with a double pulley 17 thereon, which are parts of a power take-off mechanism also driven by said engine.

The improved vegetation cutter forming the subject of this invention is designated generally by the numeral 20, and as shown in Figures 1 and 2, is positioned forwardly and slightly off set to one side of said tractor. The cutter 20 is rigidly attached to and bodily carried by the tractor, there being a transversely extending right angled member 21 of a frame 22 of said cutter attached, as at 23, to the forward ends of the handle bars 12, and also attached, as at 24, to the forward ends of a pair of bars 25 projecting forwardly from the axle 13.

In addition to the right angled rear member 21, the frame 22 consists of upper and lower horizontal side members 26 and 27 directed forwardly from each end of said transverse rear member 21, and a forward vertical member 28 connecting and supporting each pair of side members 26 and 27 in parallel spaced relation to one another. The members 26 and 27 have their rear ends welded or otherwise fixed to the rear member 21, there being corner reinforcing members 29 employed to further assist in providing complete rigidity at such connections. The parallel side members 26 and 27 are shown as being hollow and box shape in cross section but may be of any other configuration so long as they provide slides for bearing blocks 30 positioned therebetween. In order that the bearings 30 may be assembled or disassembled should they become damaged, the opposite ends of the forward vertical members 28 are bolted to and detachable from the side members 26 and 27, as shown at 31 and 32, respectively. Extending crosswise of and through each vertical frame member 28, there is a bolt 33 that is connected to a bearing block 30 for adjusting said bearing blocks forwardly and rearwardly on the frame. A pair of nuts 34 on each bolt 33 engage opposite sides of its associated frame member 28 to hold the bearing blocks in adjusted positions.

Extending transversely of the frame 20 and rotatably supported at its opposite end portions in the bearing blocks 30, is a shaft 35 of a revolving cutter head 36 that is positioned between the opposite side members of the frame. Outwardly of the side of the frame 20 that is off set inwardly of the tractor and fixed to the shaft 35, there is a double pulley 37 to which power is applied for rotating said shaft. This power is derived from the take-off pulley 17 on the engine of the tractor and is transmitted from said power take-off pulley to the pulley 37 by means of a pair of belts 38 to a double pulley 39, through a manually controlled reverse mechanism 40 to a double pulley 41, and by double belts 42 to the pulley 37. The reverse mechanism 40 is of conventional construction, is mounted on and rearwardly of the engine, and has a control arm 43 outwardly of its housing to which is connected a push and pull rod 44 extending to a location for convenient operation by the operator of the implement.

Fixed at spaced intervals along the shaft 35, and positioned between the bearing blocks 30, there is a plurality of collars 45, each having thereon a disk-like radial flange 46 that has its rim portion shaped to provide sharp corners 47 which serve as cutting edges. A plurality of rods 48 arranged parallel with and positioned outwardly of the shaft 35 extend through openings 49 in all of the flanges 46 and are stabilized throughout their length by said spaced flanges. Each of the rods 48 is removable, there being a head 50 on one end and a nut 51 threaded on the opposite end. Alternately arranged along the rods 48 and in each space between the disk-like flanges 46 are pluralities of cutter blades 52 and spacer washers 53, there being openings 54 in the cutter blades through which the rods extend for pivotally supporting said blade. The blades 52 have flat sides, are of elongated and substantially rectangular shape, and have the pivotal openings 54 therein loose on the rods and arranged adjacent an end portion thereof so that their opposite or free ends due to greater weight will be swung outwardly by centrifugal force upon rotation of the shaft 35. Both ends of the blades 52 have V-shape notches 55 therein that extend to the opposite side edges of said blades in a manner so as to provide a pair of sharp cutting edges 56 at each end. In order that the blades may be reversed end for end should the cutting edges at one end become dull, because of excessive use, openings 54ª are provided adjacent the other ends of the blades for also pivotally supporting said blades.

Attention is now directed to Figure 3 wherein there is shown three dash and dot line circles A, B and C of different diameters and all concentric with the center of the shaft 35 and representing the path of rotary movement of the inner cutting edges 56 on the pivoted ends of the blades 52, cutting edges 47 on the disk-like flanges 46, and outer cutting edges 56 on the free ends of the blades 52, respectively. Also in Figure 3, it will be observed that the spaced disk-like flanges 46 are shown as having their outer edge portions triangular in shape and it is at each apex portion of the triangular flanges that a cutting edge 47 is provided and a rod 48 is supported, thus providing three rows of cutters. However, should a greater number of rows of cutters be desired, the edge portions of the blade supporting flanges 46 could be of a different shape in accordance with the number of rows used. It will further be noted that the blades 52 of different rows are staggered relative to one another, as clearly shown in Figure 4. This is accomplished by differences in thickness of some of the spacer washers 53 relative to other of said washers.

A ground engaging structure generally indicated by the numeral 57 slides over the surface of the ground so as to support the frame 22 and revolving cutter head 36 carried thereby at a proper height above the ground surface. This ground engaging structure is adjustable relative to the frame 22 and consists of a pair of runners 58, a pair of rearward stiff arms 59 connecting the rear end portions of the runners to the frame, and a pair of forward link-like arms 60 extending between the forward end portions of said runners and said frame, there being one runner 58, one rear stiff arm 59, and one link-like arm 60 at each side of the frame 20. The rear stiff arms 59 are pivotally connected at their lower ends, as at 61, to the runners 58 and are adjustably connected substantially midway of their lengths and at their upper ends to the outer sides of the frame 20 by means of bolts 62 and 63, respectively, fitted into holes in said frame and different holes of a row of holes 64 in each arm. The forward arms 60 which function like links are pivotally connected to both the runners 58 and the frame 22 by means of bolts 65 and 66 respectively, and like the arms 59 have rows of holes 67 therethrough for adjustment. Thus, it can be seen that by securing the staff arms 59 against pivotal movement relative to the frame said arm will prevent pivotal movement at the other pivoted connections of the runner to the frame.

A hood 68 composed of a stationary section 69 and an adjustable section 70 covers the cutter head and are mounted on the upper horizontal side member 26 of the frame 22 and on the opposite end portions of the revolving shaft 35, respectively. Each section has an arched upper wall 71 and a pair of end walls 72 and it is these walls of the adjustable section 70 that overlap and slide over the like walls of the stationary section when the position of said adjustable section is changed to raise or lower its forward edges. Inturned flanges 73 on the lower edges of the end walls 72 of the stationary section 69 are bolted, as at 74, to the tops of the upper members 26 of the frame. By providing slotted holes (not shown) in said flanges, this section may be moved lengthwise on the frame member 26 so as to maintain the arched upper wall 71 thereof concentric with the path of movement of the cutter head upon adjustment of said cutter head forwardly or rearwardly in the frame. By rotatably supporting the adjustable hood section 70 on the shaft 35 the arched upper wall of said section will always be concentric to the path of rotation of the cutter head. A bolt 75 extended through a hole in the arched upper wall of the stationary section and through any one of a number of holes 76 in the arched wall of the adjustable section and having a wing nut 77 threaded thereon holds said adjustable section against turning movement on the shaft 35.

In operation, the revolving cutter head normally rotates at a relative high rate of speed in the direction indicated by the arrow 78 in Figure 3 of the drawings, which causes the cutter blades 52 to assume positions radiating from the axis of rotation of said head, as shown in dotted lines in Figure 3, due to centrifugal force. While assuming such outward positions the cutting edges 56 on the inner ends of the cutting blades 52, the cutting edges 47 on the disk-like supporting flanges 46, and the cutting edges 56 on the outer ends of the blades 52, have circular paths of movement, as indicated by the dash and dot circles A, B, and C, respectively. However, should one or more of the blades encounter an immovable object, such as a stone, stump or the like, said blades are free to swing on their individual pivotal connections to the rods 48 to lessen the chances of breaking or dulling the blades. By rotating the cutter head in the above mentioned direction, tall vegetation with stalks too large to be severed by engagement of a single cutting edge therewith will not be merely bent down and passed over by forward motion of the implement but instead will be permitted to stand upright in order that they can be shredded by continuous engagement of other cutting edges until said stalks have been completely cut. Also this direction of rotation will produce a lifting action to dead vegetation laying on the ground, so as to position such vegetation in the paths of movement of cutting edges. Furthermore, such direction of rotation will throw long severed vegetation upwardly under the confine of the hood where it will be continuously severed into small particles before being deposited on the ground.

While the drawings illustrate and the foregoing description defines the cutter head as revolving about a horizontal axis at right angles to the line of draft of the implement, it is to be understood that said cutter head may be rotatably supported in the frame at a different angular relation to the direction of travel of the implement.

In view of the foregoing description taken in conjunction with the accompanying drawings, it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention, various changes may be made without departing from the spirit and full intendment of the invention.

What is claimed is:

A mowing implement comprising a frame movable over a ground surface, a horizontal shaft extending transversely of said frame and supported at its opposite ends by said frame for rotary movement, a source of power for rotating said shaft, a plurality of disk-like flanges fixed to said shaft at spaced intervals throughout its length, a plurality of rods extending through and stabilized along their lengths by said flanges, said rods being arranged parallel with and outwardly of said shaft, a plurality of elongated cutting blades pivotally connected side by side and slightly spaced from one another on said rod, said cutting blades being arranged in groups between and spaced from said flanges, said cutting blades having their pivotal connections to said rods nearer one of their ends than the other so as to cause the longer end portions of said blades to be swung outwardly and said blades to normally assume positions radiating from said horizontal shaft upon rotation of said shaft, and cutting edges on both the longer and shorter end portions of said blades, said cutting edges on said blades being in the form of V-shaped notches in the ends of said blades and at acute angles extending to the opposite side edges of the blades.

References Cited in the file of this patent

UNITED STATES PATENTS

| | | |
|---|---|---|
| 750,329 | Windingstad | Jan. 26, 1904 |
| 2,490,564 | Vincent | Dec. 6, 1949 |
| 2,505,089 | Bailey et al. | Apr. 25, 1950 |
| 2,506,054 | Agee et al. | May 2, 1950 |
| 2,556,446 | Roach | June 12, 1951 |
| 2,620,613 | Bradley | Dec. 9, 1952 |
| 2,680,337 | Whipple | June 8, 1954 |
| 2,794,310 | Galloway | June 4, 1957 |